Patented June 7, 1949

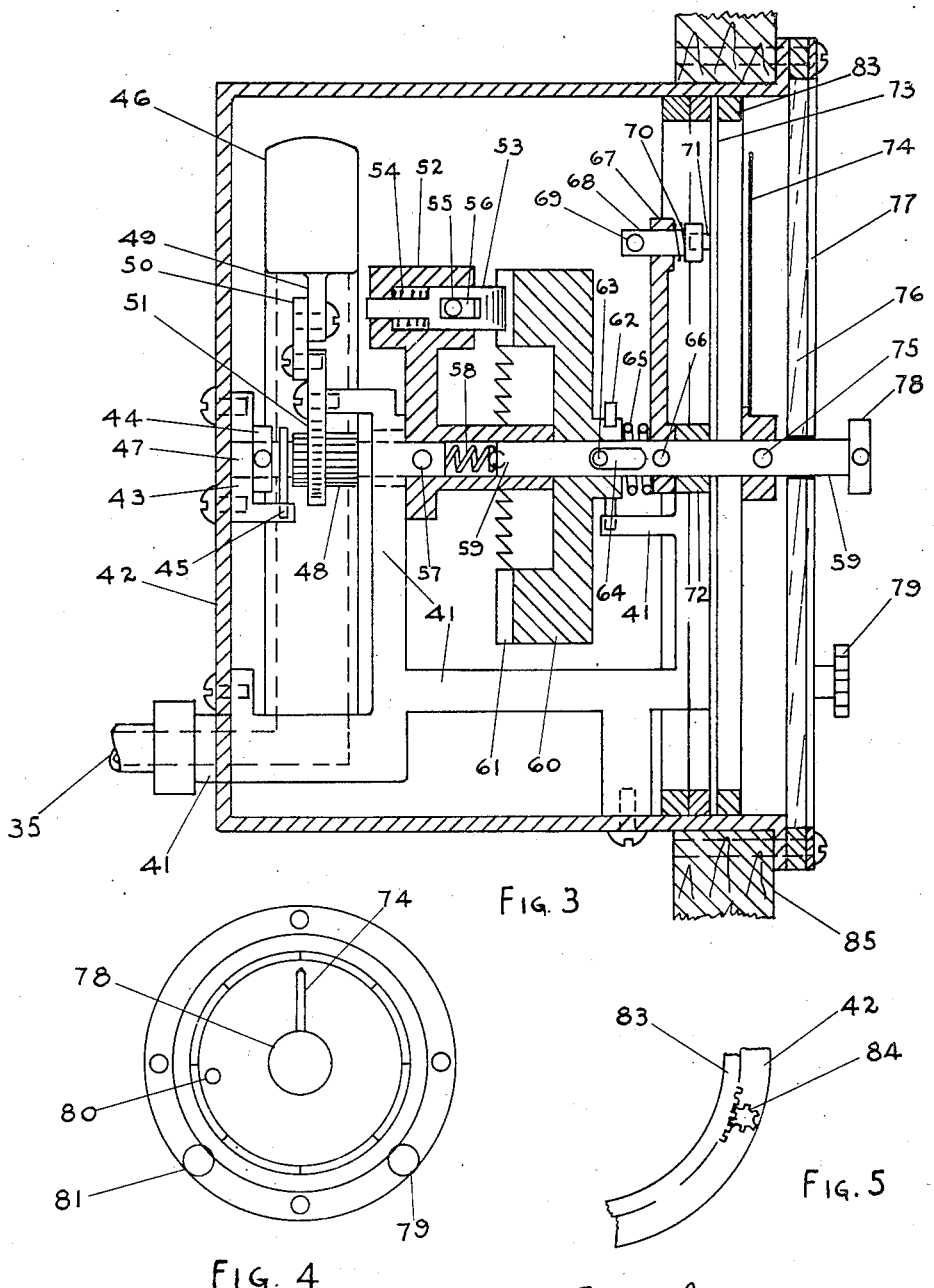

2,472,689

UNITED STATES PATENT OFFICE 2,472,689

FLUID WEIGHING SYSTEM

Harold A. Adams, Bakersfield, and Merrill Eichelberger, Kernville, Calif., assignors to E. A. B. Incorporated, a corporation Application October 7, 1944, Serial No. 557,676

2 Claims. (Cl. 265—47)

It is a general object of our invention to provide a multiple point weighing system possessing a centralized computing gauge.

An important object of our invention is to provide a weighing system by means of which both individual and aggregate weights measured by multiple scale devices may be quickly and accurately determined.

A primary object of our invention is to provide a multiple point computing scale which is adaptable to a mobile installation such as a vehicle or which may be constructed at a permanent location such as a warehouse yard.

Another purpose of our invention is to provide a means by which the force of the weight measured may be compounded so as to be more accurately and precisely indicated by the gauge.

An important purpose of our invention is the use of a fluid as the means for transmitting the strength or force as measured to the indicating gauge in order to provide an easily controlled and readily obtainable medium.

A further object of our invention is the use of a fluid under load pressure in a pipe system in order to readily locate the control and gauging mechanisms at points more or less remotely separated from the force measuring means.

An additional object of our invention is the provision of a fluid reservoir and pressure pump so that when not in use as a weighing device the system may be relieved from hydrostatic pressure but may be quickly placed in operating condition when desired.

Another purpose of our invention is to provide a weighing system by means of which either readings from multiple weighing devices attached to a single platform or readings from multiple weighing devices attached to multiple platforms may be read individually or totalized on a single computing gauge.

Additional objects and advantages of our invention will be apparent from the following description considered in conjunction with the accompanying sheets of drawings, or from both as supplements of each other, wherein are set forth certain novel features of construction, combination and arrangement of parts.

In the accompanying sheets of drawings, forming a part of these specifications, and in which like numerals are employed to designate like parts:

Figure 3 is a partial cross-sectional view of our computing gauge mechanism.

Figure 4 is a front view of the computing gauge.

Figure 5 is a front view of the dial rotating mechanism.

Figure 1:
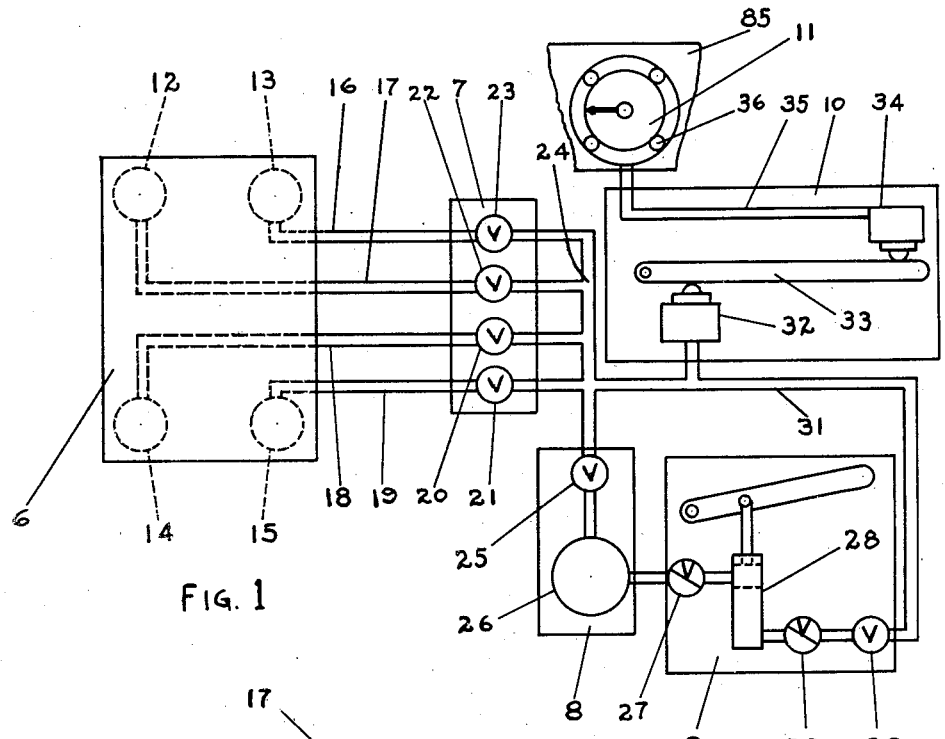
Figure 1 is a schematic diagram showing the component mechanical elements with the computing gauge attached to the other elements by means of the connecting system, all of which exemplify the principles of our invention.
Figure 2:
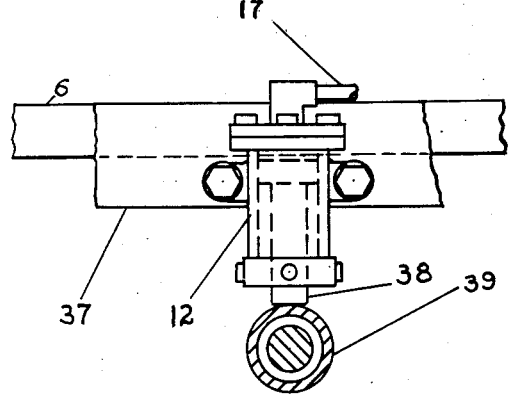
Figure 2 is a side elevation of a typical pressure cylinder as used for the weighing platform or the compounding mechanism.

Referring now in detail to Figures 1, 2, 3, 4 and 5, where, for purposes of illustration are shown preferred embodiments of our invention as adapted to a mobile vehicle installation, numeral 6 indicates a single weighing platform with multiple weighing cylinders 12, 13, 14 and 15 attached thereto. Pipes 16, 17, 18 and 19 connect weighing cylinders 13, 12, 14 and 15 respectively to shut-off valves 23, 22, 20 and 21, located in control panel 7. Attached to the shut-off valves in panel 7 is a header 24. In panel 8 is located a suitable reservoir 26 for the collection and storage of the liquid medium which is forced under pressure built up by pump 28 to the weighing cylinders 13, 12, 14 and 15 and compounding pressure cylinder 32. A shut-off valve 25 is inserted between reservoir 26 and header 24 and a check valve 27 is inserted between reservoir 26 and pump 28. Connected to pump 28 is check valve 29 and shut-off valve 30. From valve 30 connection is made to header 24.

In panel 10 are located the compounding mechanism elements consisting of pressure cylinder 32 which has its piston rod under the influence of the pressure supplied by header 24 bearing against compounding lever 33. Compounding lever 33 operated by the piston rod of cylinder 32 is forced against and operates the piston rod of cylinder 34 thereby building up pressure in cylinder 34. From pressure cylinder 34 a pipe 35 connects to computing gauge 11 secured to instrument panel 85 by screws 36.

To weighing platform frame 37 is attached pressure cylinder 12 which is connected to valve 22 by pipe 17. The piston plunger 38 of cylinder 12 is shown resting upon vehicle axle 39 in an operated position.

Within housing 42 of our computing gauge is attached frame 41 on which is mounted the computing mechanism parts. Piping 35 is connected to the pressure inlet mounted on frame 41. Attached to frame 41 and connecting with the pressure inlet thereon is a pressure responsive tube 46. From a bracket 49 attached to the free end of pressure responsive tube 46 a link 50 connects to internal spur gear 51, mounted on frame 41. Pinion gear 48 is cooperatively connected with the teeth of gear 51 and operates shaft 47. Shaft 47 rotates in bearing 43 attached to the housing by means of conventional fastening. Bearing against the mounting 43 is a thrust bearing 44. A spiral spring 45 is attached to bearing 43 and operates to return shaft 47 to normal position. Secured to shaft 47 and by pin 57 and rotating therewith is housing 52 for ratchet dog 53 which is movably secured therein.

The ratchet dog 53 is forced against ratchet 61 by means of spring 54 and the resultant movement of ratchet dog 53 is limited by pin 55 cooperating with slot 56. Within the shaft chamber of housing 52 is located a spring 58 in compressed relationship with pressure responsive tube shaft 47 and ratchet shaft 59. A ratchet frame 60 with ratchet teeth 61 is slideably attached to shaft 59 by means of pin 63 cooperating with slot 64. Pin 63 and slot 64 impart the rotative movement of ratchet 60 to shaft 59. Attached to frame 41 is a spring 62 tending to retain ratchet 60 in a normal position.

A brake mounting arm 67 rotates with and is secured to shaft 59 by pin 66. Between the shoulder of ratchet 60 and brake mounting arm 67 is mounted a spring 65 in compressed relationship. A brake holder 68 with brake 71 is mounted in brake mounting arm 67. A spring 70 is secured in compressed relationship between brake mounting arm 67 and brake holder 68 which is limited in travel by stop pin 69. A bearing 72 surrounding shaft 59 is secured in frame 41. Dial 73 is secured in housing 42 by anchor ring gear 83.

An indicating needle 74 rotates with and is secured to shaft 59 by pin 75. Lens 76 is secured to housing 42 by locking ring 77. A release plunger 78 is secured to shaft 59 for use in resetting the needle at any desired point. The gauge mechanism assembled in housing 42 is secured to the instrument panel 85 by conventional means. The gauge is provided with a needle stop 80 and a dial locking screw 81. A dial rotating knob 79 cooperates with gear 84 and dial anchor ring gear 83 to set the dial in any desired position.

The operation of our invention as schematically shown in the mechanical diagram Figure 1 consists primarily in measuring the load sustained by platform 6 by reading successively and cumulatively the pressures of each cylinder 12, 13, 14 and 15.

The following sequence of operations for cylinder 13 is typical of the method employed for all of the cylinders; shut-off valve 25 is closed and 23 and 30 are opened permitting connection of weighing cylinder 13 to reservoir 26 through header 24, pipe 31, valve 30, check valve 29, pump 28 and check valve 27. The fluid withdrawn by operation of pump 28 from reservoir 26 is transmitted to header 24, primary compounder cylinder 32 and weighing cylinder 13 until sufficient pressure is built up to support the weight resting on cylinder 13. The pressure in primary compounder cylinder 32 forces its piston plunger against compounder lever 33, which through its operative action on the piston plunger of secondary cylinder 34 builds up pressure in pipe 35 and pressure responsive tube 46 connected thereto or a similar pressure responsive device. The consequent movement of the free end of the pressure responsive tube is transferred through connecting link 50 to gear 51. Movement of gear 51 is transmitted through the pinion gear 48, shaft 47 and housing 52 to ratchet dog 53. Rotative movement of ratchet dog 53 is transmitted through ratchet 61, ratchet frame 60 and ratchet shaft 59 to the needle 74 thus indicating the force exerted in cylinder 13 in suitable units, pounds, ounces or other desired measuring units. The load suported by cylinder 13 having been properly indicated by needle 74, valves 23 and 30 are closed, and 25 opened permitting header 24, pipe 31 and pressure cylinder 32 to return to normal pressure. Through the release of the operating compounder lever 33 the pressure in secondary cylinder 34 and pipe 35 returns to normal and is correspondingly reflected in pressure responsive tube 46 which also returns to normal position.

The counter-rotative movement imparted to ratchet dog 53 through the connecting mechanism when the pressure responsive tube 46 returns to its normal position is not imparted to indicating needle 74 because the friction braking action generated by brake 71, through the connecting mechanism holds ratchet 61 stationary and consequently the lip of ratchet dog 53 slides over the inclined surfaces of ratchet 61. The gauging mechanism having returned to its normal unoperated position, valve 25 is closed and 22 and 30 connecting to cylinder 12 are opened. The procedure and sequence of operations in reading the load sustained by cylinder 12 are the same as for cylinder 13 except that the movement of the pressure responsive tube transmitted through the connecting mechanism moves the indicating needle 74 forward from its previous position for cylinder 13 the proportional distance required for the load sustained by cylinder 12 resulting in a cumulative weight indication that is, the weight registered by cylinders 13 and 12. By similar operations of the respective control valves the individual loads sustained by any number of multiple pressure cylinders may be correctly measured and indicated in a cumulative totalized form by the use of our computing scale system.

It will be understood that while the form of our multiple point computing scale device herein described and illustrated is to be considered as a preferred embodiment of our invention, we do not limit ourselves to the precise construction so described but reserve the right to resort to and substitute various modifications and changes in shape, size and arrangement of parts without departing from the spirit of our invention or the scope of our claims as described and indicated above and in the drawings and the following claims.

Having thus described our invention, we claim:

1. Weighing apparatus, comprising a plurality of pressure responsive units disposed in spaced relationship, a load carrier supported upon the pressure responsive units, a gauge constructed to respond incrementally to a series of fluid pressure values, fluid filled lines for connecting each pressure responsive unit with said gauge, a control valve in each line whereby the gauge may be selectively energized serially by each of said pressure responsive units so as to register and totalize the load carried by the several units.

2. Plural fluid pressure responsive vessels; control valves; a fluid pressure responsive mechanical movement; a single registration dial; a single step-by-step incremental force indicating pointer; a piping system connecting said plural pressure responsive vessels with said control valves and said pressure responsive mechanical movement; a fluid functioning within said plural pressure responsive vessels, said control valves, said fluid pressure responsive mechanical movement and said piping system; means connecting said fluid pressure responsive mechanical movement to said single registration dial and said step-by-step incremental force indicating pointer whereby the single registration dial and single indicating pointer may be selectively energized by the operation of said control valves to indicate both the individual and total loads sustained by the plural fluid pressure responsive vessels.

HAROLD A. ADAMS.
MERRILL EICHELBERGER.

REFERENCES CITED

The following references are of record in the file of this patent:

UNITED STATES PATENTS

| Number | Name | Date |
| --- | --- | --- |
| 512,799 | Bronson | Jan. 16, 1894 |
| 999,740 | Bilbrough | Aug. 8, 1911 |
| 1,147,128 | Troll | July 20, 1915 |
| 1,956,096 | Goodale | Apr. 24, 1934 |
| 2,020,307 | Fitch | Nov. 12, 1935 |
| 2,041,987 | Wickstrom | May 26, 1936 |
| 2,093,141 | Sonsalla | Sept. 14, 1937 |
| 2,109,460 | Brasher | Mar. 1, 1938 |
| 2,352,934 | Bohannan | July 4, 1944 |

FOREIGN PATENTS

| Number | Country | Date |
| --- | --- | --- |
| 301,670 | Great Britain | Dec. 6, 1928 |